(12) United States Patent
Byrne et al.

(10) Patent No.: US 10,836,545 B2
(45) Date of Patent: Nov. 17, 2020

(54) INTERNET-CONNECTED STORAGE CONTAINER AND SYSTEM AND METHOD OF DISPENSING ARTICLES

(71) Applicant: Carnegie Mellon University, Pittsburgh, PA (US)

(72) Inventors: Daragh Joseph Byrne, Pittsburgh, PA (US); Jonathan Cagan, Pittsburgh, PA (US); Stephen Van Marter Krotseng, Chicago, IL (US); Shraddha Premjibhai Joshi, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 16/327,018

(22) PCT Filed: Aug. 22, 2017

(86) PCT No.: PCT/US2017/047957
§ 371 (c)(1),
(2) Date: Feb. 21, 2019

(87) PCT Pub. No.: WO2018/039196
PCT Pub. Date: Mar. 1, 2018

(65) Prior Publication Data
US 2019/0210772 A1    Jul. 11, 2019

Related U.S. Application Data

(60) Provisional application No. 62/494,847, filed on Aug. 22, 2016.

(51) Int. Cl.
*B65D 43/26* (2006.01)
*B65D 25/04* (2006.01)
(Continued)

(52) U.S. Cl.
CPC ............. *B65D 43/26* (2013.01); *B65D 25/04* (2013.01); *B65D 43/267* (2013.01);
(Continued)

(58) Field of Classification Search
CPC ...... B65D 43/26; B65D 43/267; B65D 25/04; H04W 4/80
(Continued)

(56) References Cited

U.S. PATENT DOCUMENTS 3,648,241 A * 3/1972 Naito ................ A47B 53/02
340/5.5
2004/0194471 A1   10/2004 Rickson
(Continued)

FOREIGN PATENT DOCUMENTS

JP       2006336255 A    12/2006

OTHER PUBLICATIONS

Machine Translation—Yamamoto, Hiroya, "Delivery container, and locking/unlocking control system for delivery container", (2006), 32 pages (Year: 2006).*
(Continued)

*Primary Examiner* — Paultep Savusdiphol
(74) *Attorney, Agent, or Firm* — The Webb Law Firm

(57) ABSTRACT

Provided is a storage container including a base and a cartridge container attachable to the base. The cartridge container defines a plurality of internal chambers and includes a plurality of individually operable doors, each of the plurality of doors corresponding to one of the internal chambers. The storage container further includes a plurality of individually addressable actuators disposed in at least one of the base and the cartridge container, each of the plurality of actuators corresponding to one of the doors. A microprocessor is programmed or configured to receive at least one instruction from a server computer, and transmit a command, based on the at least one instruction, to actuate one of the plurality of actuators. Actuating one of the plurality of actuators causes the corresponding door to move from a closed position to an opened position. Systems and methods are provided for remote and immediate dispensing of articles.

21 Claims, 14 Drawing Sheets

(51) Int. Cl.
| | |
|---|---|
| *H04W 4/80* | (2018.01) |
| *E05B 47/00* | (2006.01) |
| *E05G 1/00* | (2006.01) |
| *E05G 1/08* | (2006.01) |
| *H04L 29/08* | (2006.01) |

(52) U.S. Cl.
CPC .......... *E05B 47/0002* (2013.01); *E05G 1/005* (2013.01); *E05G 1/08* (2013.01); *H04W 4/80* (2018.02); *B65D 2543/00166* (2013.01); *E05B 2047/0094* (2013.01); *E05Y 2900/602* (2013.01); *H04L 67/12* (2013.01)

(58) Field of Classification Search
USPC .................................................. 235/382, 492
See application file for complete search history.

(56) References Cited

U.S. PATENT DOCUMENTS

| | | | | |
|---|---|---|---|---|
| 2006/0237427 | A1* | 10/2006 | Logan | .............. E05B 47/06 219/401 |
| 2009/0187274 | A1* | 7/2009 | Higham | ............. G07C 9/00912 700/237 |
| 2012/0187128 | A1* | 7/2012 | Weber | .................. E05B 15/022 220/324 |
| 2013/0327327 | A1 | 12/2013 | Edwards et al. | |
| 2014/0138440 | A1* | 5/2014 | D'Ambrosio | ........ G06Q 20/203 235/385 |
| 2015/0251839 | A1 | 9/2015 | Denny et al. | |
| 2017/0178128 | A1 | 6/2017 | Fourez et al. | |

OTHER PUBLICATIONS

Brave et al., "inTouch: A Medium for Haptic Interpersonal Communication", CHI '97 Extended Abstracts on Human Factors in Computing Systems, 1997, pp. 363-364, ACM, New York, NY.

Chang et al., "LumiTouch: an emotional communication device", CHI '01 Extended Abstracts on Human Factors in Computing Systems, 2001, pp. 313-314, ACM, New York, NY.

Chang et al., "ComTouch: Design of a Vibrotactile Communication Device", Proceedings of the 4th Conference on Designing Interactive Systems: Processes, Practices, Methods, and Techniques (DIS '02), 2002, pp. 312-320, ACM, New York, NY.

Lee et al., "Lover's Cups: Drinking Interfaces as New Communication Channels", CHI '06 Extended Abstracts on Human Factors in Computing Systems, 2006, pp. 375-380, ACM, New York, NY.

Reed et al., "Imagining the Future: Thoughts on Computing", Computer, 2012, pp. 25-30, vol. 45, No. 1.

* cited by examiner

INTERNET-CONNECTED STORAGE CONTAINER AND SYSTEM AND METHOD OF DISPENSING ARTICLES

CROSS REFERENCE TO RELATED APPLICATIONS

This application is the United States national phase of International Application No. PCT/US2017/047957 filed Aug. 22, 2017, and claims the benefit of U.S. Provisional Application No. 62/494,847, filed Aug. 22, 2016, which are hereby incorporated by reference in their entirety.

BACKGROUND OF THE INVENTION

Field of the Invention

This invention relates generally to an Internet-connected storage container, in a particular embodiment, to a storage container having a plurality of independently operable doors. This invention also relates to systems and computer-implemented methods for dispensing articles on demand or at predisposed times.

Description of Related Art

Technology is constantly empowering new forms of human-to-human connection. Mobile phones and short message service (SMS), for example, have radically transformed when, where and how people are able to communicate with each other. More recently, the rise of the Internet of Things ("IOT") has begun to influence how people interact with Internet-connected products. The IOT broadly refers to the use of embedded intelligence, computing, and connectivity in ordinary devices such as food packaging, furniture, and appliances. While dedicated computing devices such as laptops, tablets and smartphones are widely used for Internet-based communication, it is theorized that the IOT will transform this current paradigm and result in more and more everyday objects and common appliances implemented with embedded connectivity and computing power.

The associated diversification of computing may increase the ways in which embedded and mobile computing influence human interactions. Many IOT devices are developed with an aim towards technical functionality and utility. However, the IOT also creates new opportunities to enrich interpersonal human connections. In particular, interconnected IOT devices may facilitate communication, empathy, and affection between geographically separated people. While interpersonal connection is an area of increasing interest for internet-enabled device experiences, the existing art has focused on remote communication, whereby an Internet-based device allows gestures to be transmitted through connected objects. For example, the Massachusetts Institute of Technology Media Lab's LumiTouch is a pair of interactive picture frames. The frames are touch sensitive and when one user touches a frame, the other frame illuminates as an indication that the other person is thinking about them.

However, existing approaches to IOT interpersonal communication have several limitations. First, they are entirely digital and may lack the personalization, thoughtfulness or affection associated with real physical gestures. Further, existing IOT devices fail to accommodate the innate human desire to exchange material objects such as tokens, gifts, or letters, or to receive rewards. This is especially true where an impromptu, rather than predetermined, exchange is desired.

In light of these limitations of the existing art, there exists a need for an Internet-connected device which may facilitate the impromptu exchange of material objects.

SUMMARY OF THE INVENTION

According to a non-limiting embodiment of the present invention, a storage container includes a base and a cartridge container attachable to the base. The cartridge container defines a plurality of internal chambers and includes a plurality of individually operable doors, each of the plurality of doors corresponding to one of the internal chambers. The storage container further includes a plurality of individually addressable actuators disposed in at least one of the base and the cartridge container, each of the plurality of actuators corresponding to one of the doors. A microprocessor is programmed or configured to receive at least one instruction from a server computer, and transmit a command, based on the at least one instruction, to actuate one of the plurality of actuators. Actuating one of the plurality of actuators causes the corresponding door to move from a closed position to an opened position.

In another non-limiting aspect or embodiment, one or more, or each, of the plurality of actuators includes a solenoid having an extendable and retractable actuating rod configured to engage the corresponding door.

In another non-limiting aspect or embodiment, one or more, or each, of the plurality of actuators includes an electromagnet configured to repel a door magnet disposed in the corresponding door.

In another non-limiting aspect or embodiment, the cartridge container is removably attached to the base such that the cartridge container is replaceable.

In another non-limiting aspect or embodiment, the storage container further includes a short-range identification reader disposed in the base, a short-range identification chip disposed on the cartridge container in operative alignment with the short-range identification reader. The short-range identification reader is programmed or configured to detect the short-range identification chip on the cartridge container when the cartridge is attached to the base In another non-limiting aspect or embodiment, the cartridge container further includes a plurality of door release latches configured to engage the plurality of doors, each of the door release latches corresponding to one of the plurality of doors and one of the plurality of actuators. Actuating one of the plurality of actuators causes the corresponding door release latch to disengage from the corresponding door.

In another non-limiting aspect or embodiment, the cartridge container is one of a plurality of stackable cartridge containers of the same or differing size.

In another non-limiting aspect or embodiment, the base includes a base contact plate electrically connectable to a contact terminal of a first of the stackable cartridge containers. The first of the stackable cartridge containers includes a cartridge contact plate electrically connectable to a contact terminal of a second of the stackable cartridge containers. The base contact plate and the cartridge contact plate each include one or more electrically conductive contacts configured to interface and establish an electrical circuit with corresponding electrically conductive contacts on the interfacing contact terminal.

In another non-limiting aspect or embodiment, each of the plurality of stackable cartridge containers includes a subprocessor programmed or configured to receive the command from the microprocessor.

In another non-limiting aspect or embodiment, the microprocessor is further programmed or configured to transmit identifying information associated with the cartridge container to the server computer.

In another non-limiting aspect or embodiment, the cartridge container is refillable.

In another non-limiting aspect or embodiment, the microprocessor is programmed or configured to transmit the command instantaneously upon receiving the at least one instruction.

Other aspects or embodiments of the present invention relate to a system for remotely dispensing articles. In a non-limiting aspect or embodiment, the system includes a storage container including a plurality of individually operable doors and a microprocessor, a client device associated with a sending user and programmed or configured to generate at least one instruction, and a server computer in communication with the client device and the storage container. The server computer programmed or configured to receive the at least one instruction from the client device and transmit a command to the microprocessor of the storage container based on the at least one instruction. The microprocessor of the storage container is programmed or configured to actuate an actuator corresponding to one of the individually operable doors based on the command transmitted by the server computer, wherein actuating the actuator causes the corresponding one of the individually operable doors to open.

In another non-limiting aspect or embodiment, the storage container includes a cartridge container and a base, the cartridge container including the plurality of individually operable doors and the base comprising the microprocessor.

In another non-limiting aspect or embodiment, the server computer includes a database containing identifying information associated with the cartridge container.

In another non-limiting aspect or embodiment, the client device includes a mobile interface having a plurality of selectable options, and the at least one instruction is based on one of the plurality of selectable options chosen by the sending user.

In another non-limiting aspect or embodiment, the client device is programmed or configured to retrieve at least a portion of the identifying information from the server computer, and the mobile interface of the client device is programmed or configured to display the retrieved identifying information.

In another non-limiting aspect or embodiment, the microprocessor is configured to transmit updated identifying information associated with the cartridge container to the server computer.

In another non-limiting aspect or embodiment, the client device is programmed or configured to obtain and store personal informatics and generate the at least one instruction based at least partially on the personal informatics.

In another non-limiting aspect or embodiment, the system further includes a merchant transaction server. The server computer is programmed or configured to generate a purchase order based on one of the selectable options of the mobile interface of the client device, and transmit the purchase order to the merchant transaction server.

In another non-limiting aspect or embodiment, the system further includes a merchant transaction server. The server computer is programmed or configured to generate a purchase order based on the identifying information of the cartridge container, and transmit the purchase order to the merchant transaction server.

In another non-limiting aspect or embodiment, the server computer is programmed or configured to transmit the command instantaneously upon receiving the at least one instruction.

Other aspects or embodiments of the present invention relate to a computer-implemented method for remotely dispensing articles from a cartridge container. In a non-limiting aspect or embodiment, the method includes storing, in a database of a server computer, identifying information associated with the cartridge container; receiving at least one instruction from a client device; generating a command based on the at least one instruction; and transmitting the command to a microprocessor of a storage container attached to the cartridge container. Transmitting the command causes the microprocessor to actuate an actuator of the storage container, and wherein actuating the actuator opens one of a plurality of independently operable doors of the cartridge container.

In another non-limiting aspect or embodiment, the method further includes receiving updated identifying information from the microprocessor and transmitting the updated identifying information to the client device.

In another non-limiting aspect or embodiment, the method further includes generating a purchase order for a replacement cartridge container and transmitting the purchase order to a merchant transaction server.

In another non-limiting aspect or embodiment, generating the purchase order is at least partially based on the updated identifying information.

In another non-limiting aspect or embodiment, generating the command is performed instantaneously upon receiving the at least one instruction, and transmitting the command is performed instantaneously after generating the command.

Further aspects or embodiments are set forth in the following numbered clauses:

Clause 1: A storage container comprising: a base and a cartridge container attachable to the base, the cartridge container defining a plurality of internal chambers and includes a plurality of individually operable doors, each of the plurality of doors corresponding to one of the internal chambers; a plurality of individually addressable actuators disposed in at least one of the base and the cartridge container, each of the plurality of actuators corresponding to one of the doors; and a microprocessor programmed or configured to receive at least one instruction from a server computer, and transmit a command, based on the at least one instruction, to actuate one of the plurality of actuators; wherein actuating one of the plurality of actuators causes the corresponding door to move from a closed position to an opened position, and wherein, optionally, one or more of the internal chambers encloses an object, such as: a token, a gift, a letter or note, money, or a gift card.

Clause 2: The storage container of clause 1, wherein, one or more, or each of the plurality of actuators comprises a solenoid having an extendable and retractable actuating rod configured to engage the corresponding door.

Clause 3: The storage container of clause 1, wherein each of the plurality of actuators comprises an electromagnet configured to repel a door magnet disposed in the corresponding door.

Clause 4: The storage container of any of clauses 1 to 3, wherein the cartridge container is removably attached to the base such that the cartridge container is replaceable.

Clause 5: The storage container of any of clauses 1 to 4, wherein the storage container further comprises: a short-range identification reader disposed in the base; and a short-range identification chip disposed on the cartridge container in operative alignment with the short-range identification reader; wherein the short-range identification reader is programmed or configured to detect the short-range identification chip on the cartridge container when the cartridge is attached to the base Clause 6: The storage container of any of clauses 1 to 5, wherein the cartridge container further comprises a plurality of door release latches configured to engage the plurality of doors, each of the door release latches corresponding to one of the plurality of doors and one of the plurality of actuators; and wherein actuating one of the plurality of actuators causes the corresponding door release latch to disengage from the corresponding door.

Clause 7: The storage container of any of clauses 1 to 6, wherein the cartridge container is one of a plurality of stackable cartridge containers of the same or differing sizes.

Clause 8: The storage container of clause 7, wherein the base comprises a base contact plate electrically connectable to a contact terminal of a first of the stackable cartridge containers; wherein the first of the stackable cartridge containers comprises a cartridge contact plate electrically connectable to a contact terminal of a second of the stackable cartridge containers; and wherein the base contact plate and the cartridge contact plate each comprise one or more electrically conductive contacts configured to interface and establish an electrical circuit with corresponding electrically conductive contacts on the interfacing contact terminal.

Clause 9: The storage container of any of clauses 7 to 8, wherein each of the plurality of stackable cartridge containers comprises a subprocessor programmed or configured to receive the command from the microprocessor.

Clause 10: The storage container of any of clauses 1 to 9, wherein the microprocessor is further programmed or configured to transmit identifying information associated with the cartridge container to the server computer.

Clause 11: The storage container of any of clauses 1 to 10, wherein the cartridge container is refillable.

Clause 12: The storage container of any of clauses 1 to 11, wherein the microprocessor is programmed or configured to transmit the command instantaneously upon receiving the at least one instruction.

Clause 13: A system for remotely dispensing articles comprising: a storage container comprising a plurality of individually operable doors and a microprocessor; a client device associated with a sending user and programmed or configured to generate at least one instruction; and a server computer in communication with the client device and the storage container, the server computer programmed or configured to receive the at least one instruction from the client device and transmit a command to the microprocessor of the storage container based on the at least one instruction; wherein the microprocessor of the storage container is programmed or configured to actuate an actuator corresponding to one of the individually operable doors based on the command transmitted by the server computer, wherein actuating the actuator causes the corresponding one of the individually operable doors to open.

Clause 14: The system of clause 13, wherein the storage container comprises a cartridge container and a base, the cartridge container comprising the plurality of individually operable doors and the base comprising the microprocessor.

Clause 15: The system of clause 13 or 14, wherein the server computer comprises a database containing identifying information associated with the cartridge container.

Clause 16: The system of any of clauses 13-15, wherein the client device comprises a mobile interface having a plurality of selectable options, and the at least one instruction is based on one of the plurality of selectable options chosen by the sending user.

Clause 17: The system of any of clauses 13-16, wherein the client device is programmed or configured to retrieve at least a portion of the identifying information from the server computer, and the mobile interface of the client device is programmed or configured to display the retrieved identifying information.

Clause 18: The system of any of clauses 13-17, wherein the microprocessor is configured to transmit updated identifying information associated with the cartridge container to the server computer.

Clause 19: The system any of clauses 13-15, wherein the client device is programmed or configured to obtain and store personal informatics and generate the at least one instruction based at least partially on the personal informatics.

Clause 20: The system of any of clauses 13-18, further comprising a merchant transaction server; wherein the server computer is programmed or configured to generate a purchase order based on one of the selectable options of the mobile interface of the client device, and transmit the purchase order to the merchant transaction server.

Clause 21: The system of any of clauses 13-18, further comprising a merchant transaction server; wherein the server computer is programmed or configured to generate a purchase order based on the identifying information of the cartridge container, and transmit the purchase order to the merchant transaction server.

Clause 22: The system of any of clauses 13-21, wherein the server computer is programmed or configured to transmit the command instantaneously upon receiving the at least one instruction.

Clause 23: A computer-implemented method for remotely dispensing articles from a cartridge container, comprising: storing, in a database of a server computer, identifying information associated with the cartridge container; receiving at least one instruction from a client device; generating a command based on the at least one instruction; and transmitting the command to a microprocessor of a storage container attached to the cartridge container; wherein transmitting the command causes the microprocessor to actuate an actuator of the storage container; and wherein actuating the actuator opens one of a plurality of independently operable doors of the cartridge container.

Clause 24: The computer-implemented method of clause 23, further comprising: receiving updated identifying information from the microprocessor; and transmitting the updated identifying information to the client device.

Clause 25: The computer-implemented method of clause 23 or 24, further comprising: generating a purchase order for a replacement cartridge container; and transmitting the purchase order to a merchant transaction server.

Clause 26: The computer-implemented method of clause 25, wherein generating the purchase order is at least partially based on the updated identifying information.

Clause 27: The computer-implemented method of any of clauses 23-26, wherein generating the command is performed instantaneously upon receiving the at least one instruction, and transmitting the command is performed instantaneously after generating the command.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
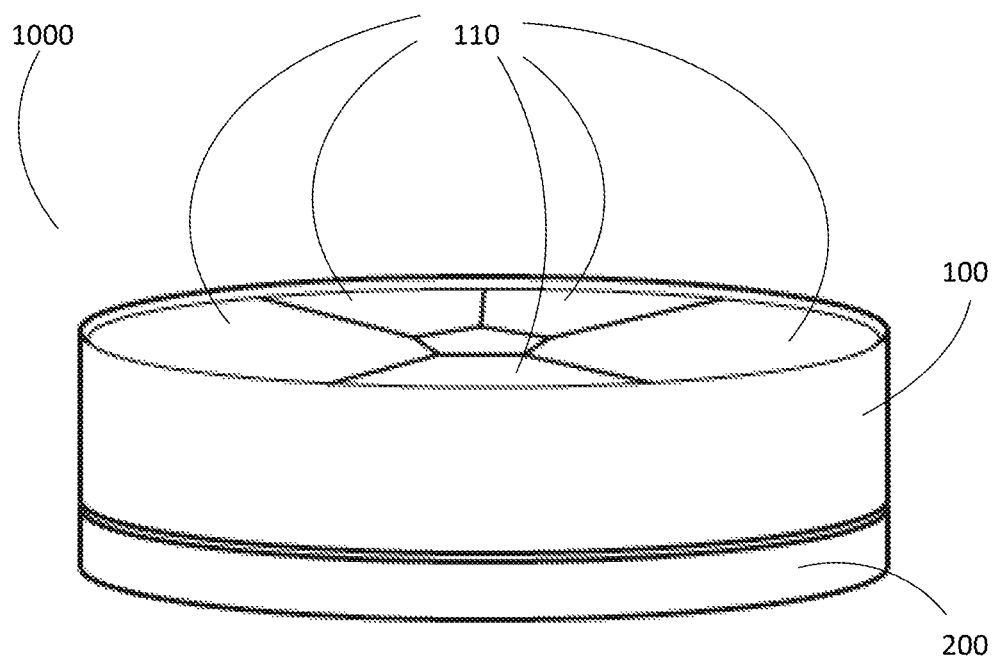
FIG. 1 is a perspective view of a storage container according to a non-limiting aspect or embodiment of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, and/or routed between the first and second unit or component. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Figure 2:
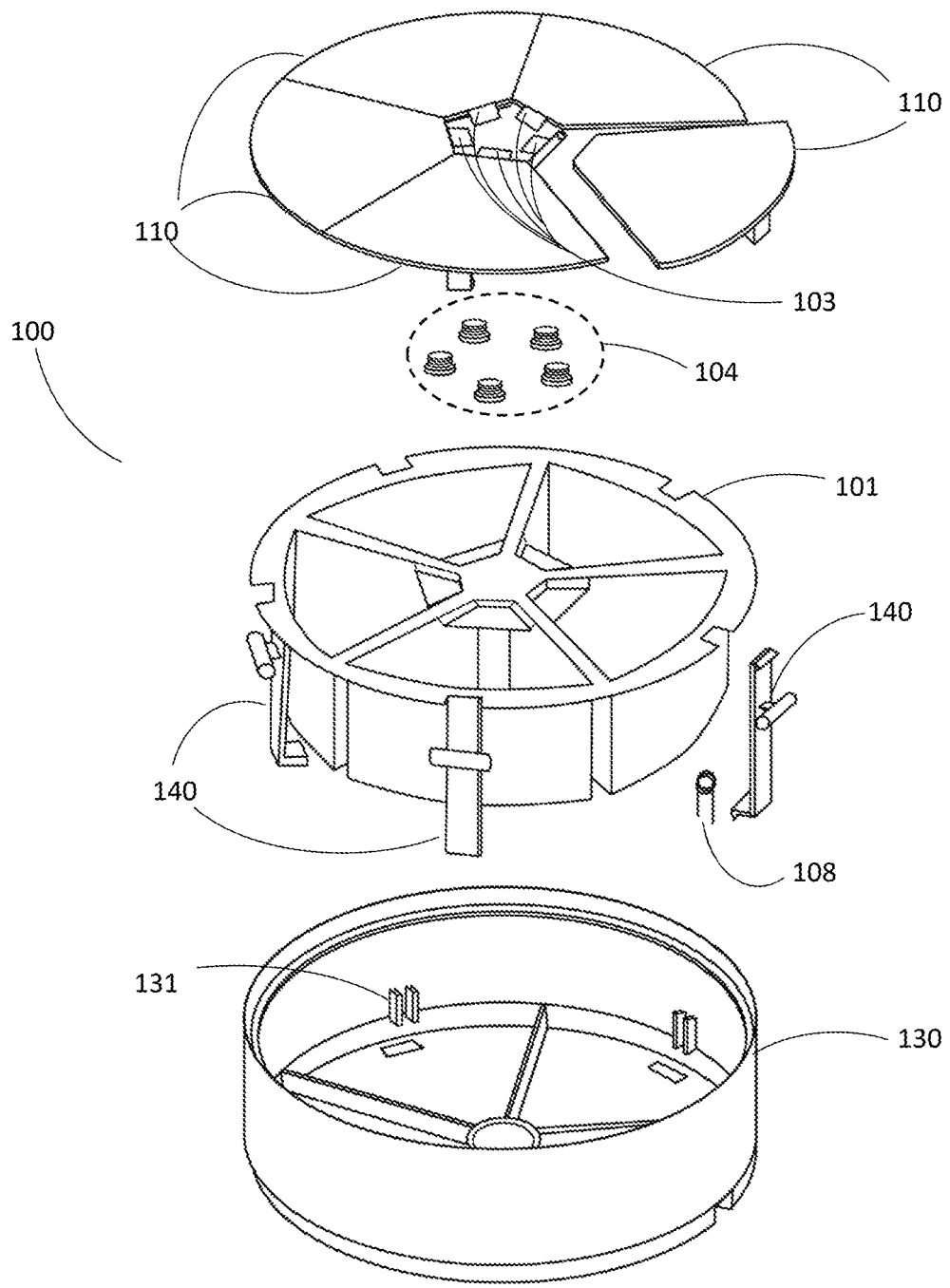
FIG. 2 is an exploded view of a cartridge container of the storage container of FIG. 1.

Non-limiting aspects or embodiments of the present invention are directed to a storage container 1000 including a plurality of individually operable doors 110, each of which corresponds to an internal chamber 120 in which an article may be stored. Referring now to FIGS. 1 and 2, the storage container 1000 generally includes two major subassemblies, namely a cartridge container 100 and a base 200. The cartridge container 100 includes the plurality of individually operable doors 110 and corresponding internal chambers 120. The cartridge container 100 fits into or is otherwise attachable to the base. In a non-limiting embodiment, the cartridge container 100 is detachable from the base, such that the cartridge container 100 may be replaced. This configuration allows multiple cartridge containers 100 to be used with the same base. For example, a user may remove the cartridge container 100 from the base 200 once all of the articles have been removed from the internal chambers 120, and place a new cartridge container 100, filled with new articles, into the same base. In a non-limiting aspect or embodiment (not shown) the cartridge container is permanently attached to the base.

FIG. 2 shows an exploded view of the components of the cartridge container 100 of FIG. 1. In particular, the cartridge container 100 includes a main compartment structure 101 which fits inside an outer housing 130. The main compartment structure 101 defines the plurality of internal chambers 120 in which articles may be stored. The plurality of doors 110 corresponding to the plurality of internal chambers 120 are mounted to the main compartment via hinges 103. A plurality of door springs 104 are disposed between the doors 110 and the main compartment structure 101 to bias the doors 110 towards an opened position. The bias of the door springs 104 is overcome by a plurality of door release latches 140, each corresponding to one of the plurality of doors 110, which hold the doors 110 in a closed position until a release event occurs. Each of the plurality of door release latches 140 is pivotally mounted in a corresponding cylindrical groove 131 of the outer housing 130, with a torsion spring 108 disposed between the door release latch 140 and the outer housing 130.

Figure 3:
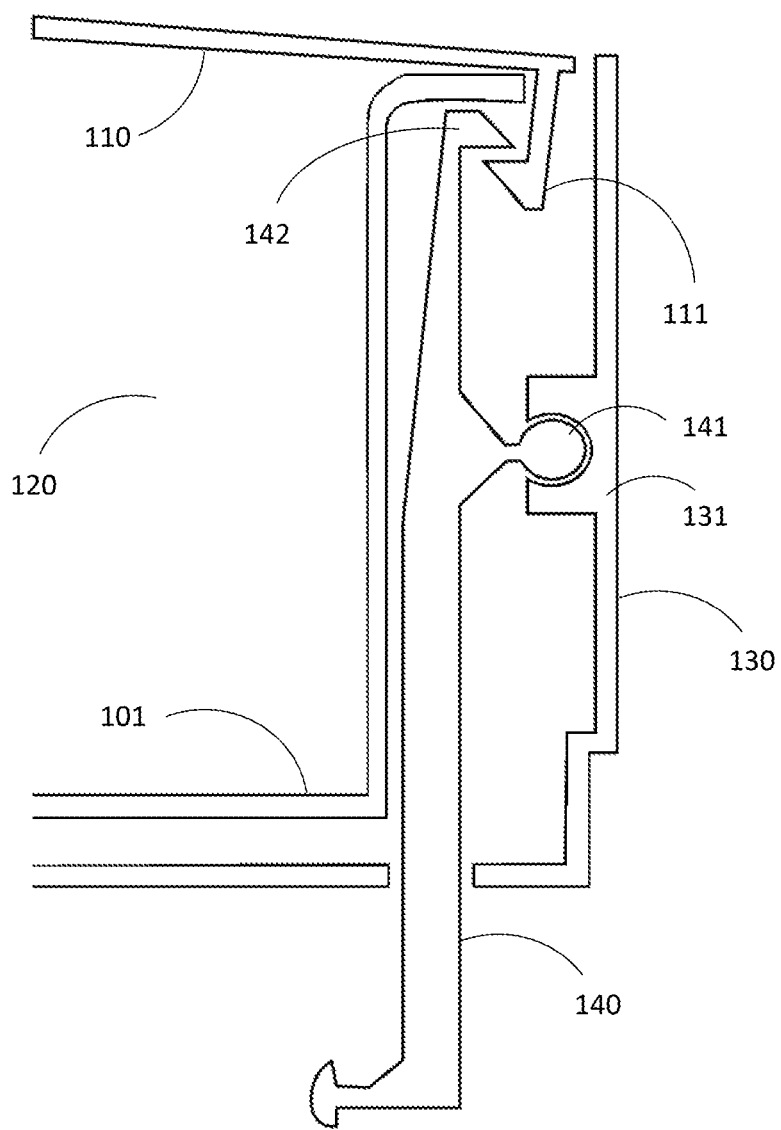
FIG. 3 is cutaway view of the cartridge container of FIG. 2, showing one of a plurality of door release latches.

Referring now to FIG. 3, each of the door release latches 140 is pivotally mounted to the outer housing 130 via a hinge portion 141. In the aspect or embodiment shown in FIG. 3, for example, the hinge portion 141 includes a cylindrical protrusion snap fitted into a cylindrical groove 131 of the outer housing 130. The torsion spring 108 (not shown) disposed between the outer housing 130 and the door release latch 140 biases the door release latch 140 into engagement with the corresponding door, such that a tab 142 on the door release latch 140 interlocks with a corresponding tab 111 on the door 110 to hold the door 110 in a closed position. Other suitable means and arrangements for connecting the door release latches 140 to the cartridge container 100 and engaging the doors 110 may be appreciated by one having ordinary skill in the art.

Figure 4:
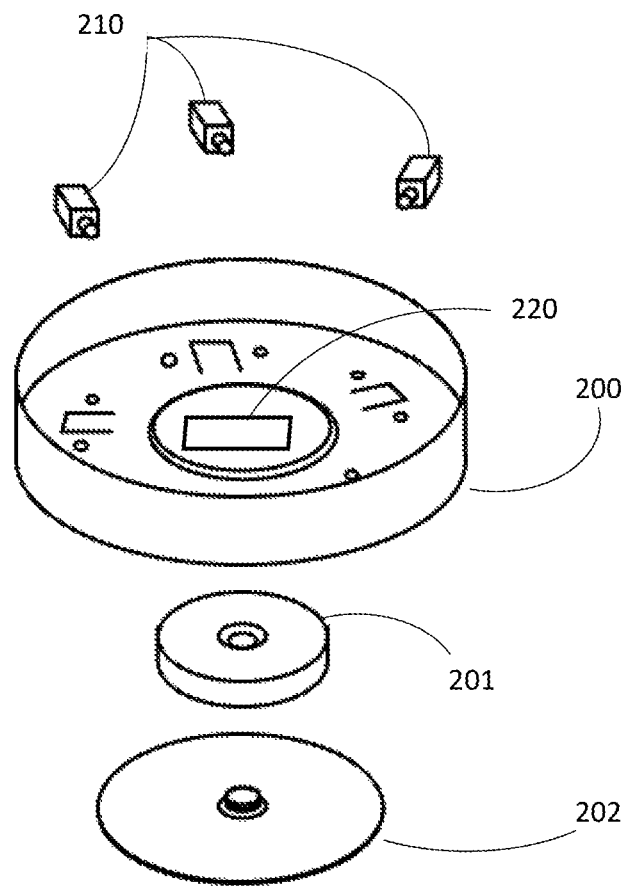
FIG. 4 is an exploded view of a base of the storage container of FIG. 1.
Figure 5:
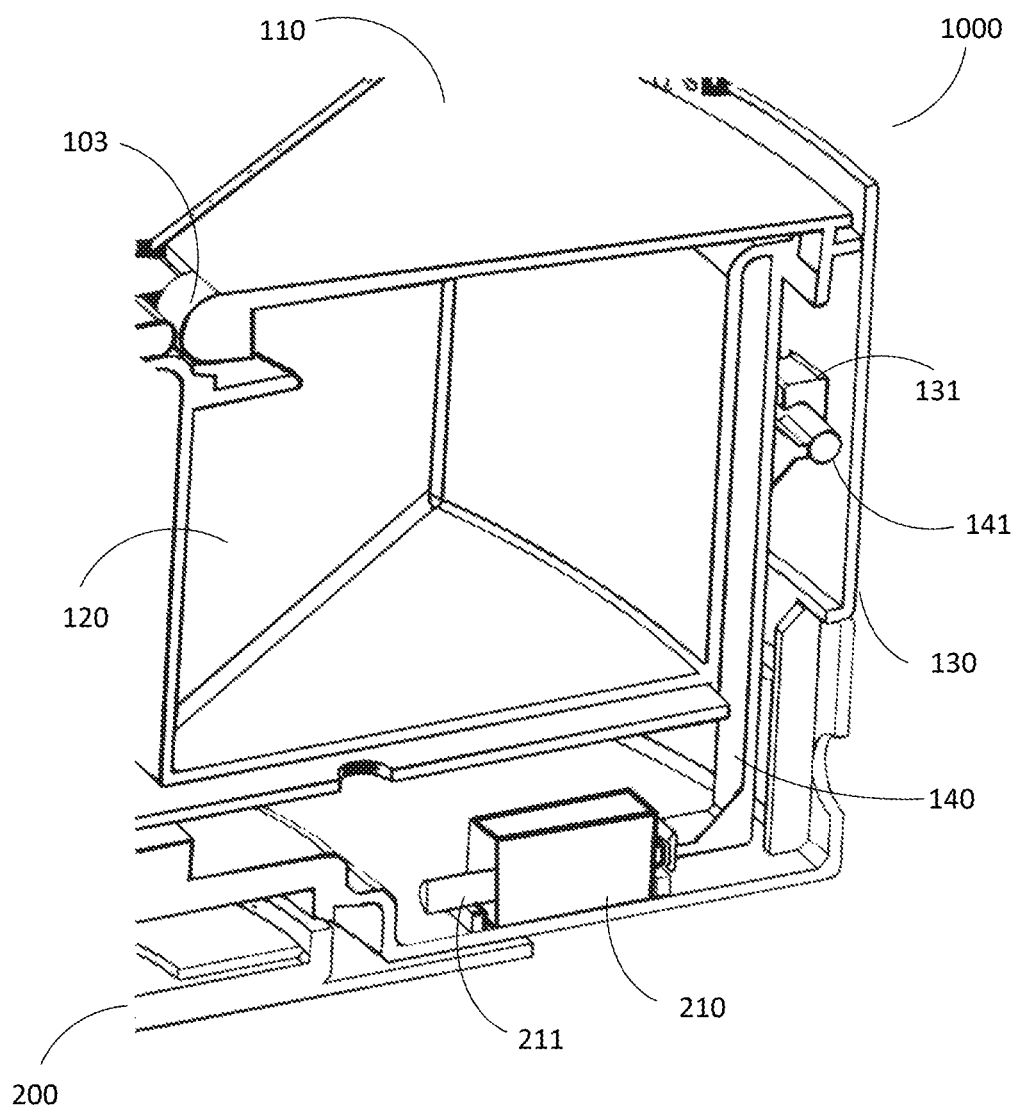
FIG. 5 is a cutaway view of the storage container of FIG. 1, showing one of a plurality of solenoids.

FIG. 4 shows an exploded view of the components of the base 200, including a plurality of actuators 210 and a microprocessor 220 in communication with the plurality of actuators 210. The microprocessor 220 may be programmed or configured to send a command associated with a release event to one or more of the plurality of actuators 210. A foot 202 may be rotatably mounted to the base 200 via a bearing 201 such that the base 200 and cartridge container 100 may be swiveled or rotated by the user. Each of the plurality of actuators 210 corresponds to one of the doors 110 of the cartridge container 100, and is configured to engage a corresponding door release latch 140 upon occurrence of a release event. As shown in FIG. 5, in a non-limiting aspect or embodiment, each of the actuators 210 may be a solenoid including an actuating rod 211 configured to extend and retract upon receiving an electrical signal from the microprocessor 220 when the release event occurs. Extension of the actuating rod 211 engages the door release latch, causing the door release latch 140 to pivot about the hinge portion 141 and disengage the interlocking tabs (111, 142) between the door release latch 140 and the door 110. With the door release latch 140 and the door 110 no longer interlocked, the door spring 104 forces the door 110 into the opened position to allow the article within the corresponding internal chamber 120 to be retrieved by the user.

In other aspects or embodiments, each actuator 210 may include an electromagnet in operable proximity to another magnet disposed in the corresponding door 110. One such aspect or embodiment is discussed hereinafter with reference to FIGS. 14A-14B. Other suitable means and arrangements for disengaging the door release latch 140 may be appreciated by one having ordinary skill in the art.

Each of the actuators 210 is independently addressable and/or controllable by the microprocessor 220 such that a release event may trigger the opening of a specific one of the plurality of doors 110. That is, the microprocessor 220 may be programmed or configured to intelligently control the plurality of actuators 210. Further, the microprocessor 220 may be configured to immediately send the command to any one of the actuators 210. By, immediately send, it is meant that the microprocessor 220 sends the command without delay, not including a reasonable time allotment for the microprocessor 220 to process the associated release event. In this manner, the time and/or condition when each article may be retrieved by the user can be precisely controlled by a remote user or device, as is discussed hereinafter with reference to FIG. 11.

Figure 6A:
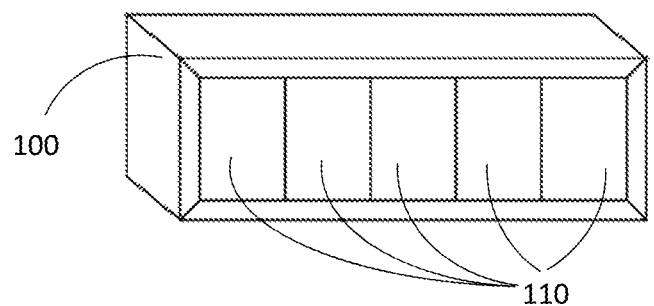
FIG. 6A is a perspective view of a storage container according to another non-limiting aspect or embodiment of the present invention.
Figure 6B:
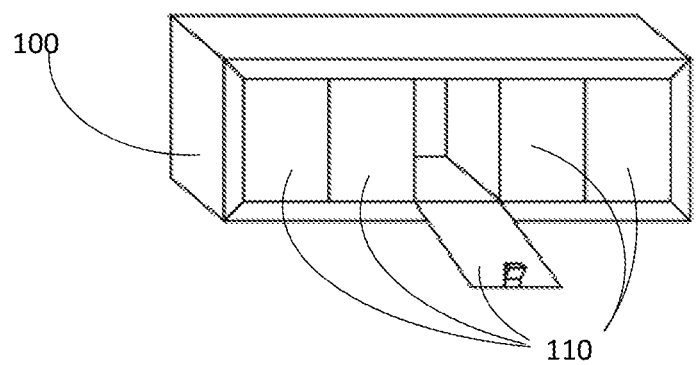
FIG. 6B is a perspective view of the storage container of FIG. 6A, showing one of a plurality of doors in the opened position.

While FIGS. 1-5 illustrates the storage container 1000 as having a generally cylindrical shape, it is to be understood that any suitable shape may be used. Referring now to FIGS. 6A-6B, a non-limiting aspect or embodiment of the storage container 1000 is generally rectangular-shaped and includes substantially the same components as the storage container 1000 of FIGS. 1-5. Accordingly, components that are not specifically discussed in reference to FIGS. 6A-6B may be understood as being similar or identical to like components of FIGS. 1-5. FIG. 6A shows the storage container 1000 with the plurality of doors 110 closed, and FIG. 6B shows the storage container 1000 with one of the plurality of doors 110 open. In this aspect or embodiment, the plurality of doors 110 are arranged on a front face of the cartridge container 100 and open forward, as opposed to the upwardly opening doors 110 of the aspect or embodiment shown in FIGS. 1-5.

Figure 7:
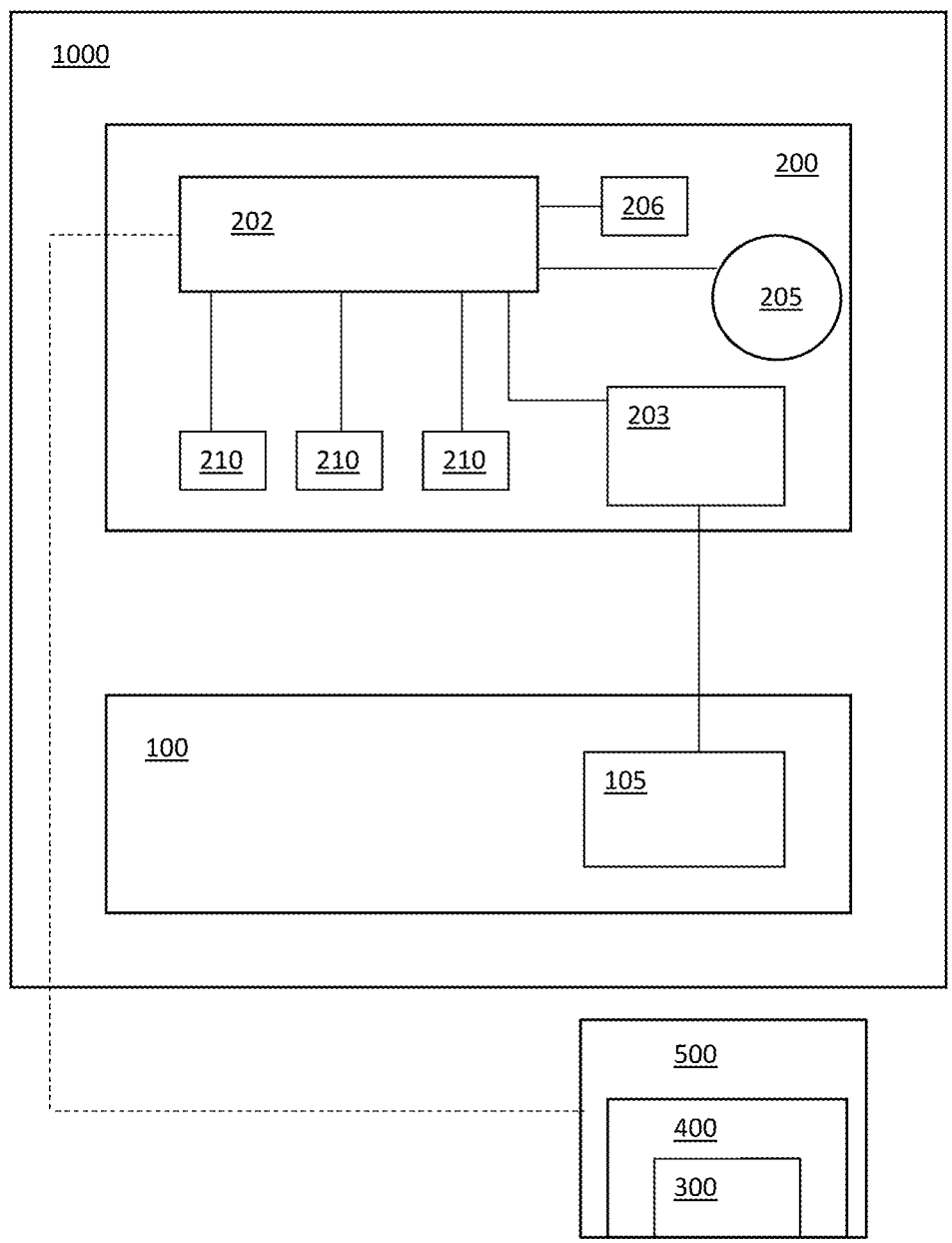
FIG. 7 is an electrical layout schematic of the storage container according to a non-limiting aspect or embodiment of the present invention.

Referring now to FIG. 7, an electrical layout schematic of a non-limiting aspect or embodiment of the storage container 1000 is shown. In addition to the components already described in reference to FIGS. 1-6B, the base 200 may further include a short-range identification reader in communication with the microprocessor 220 and programmed or configured to scan a short-range identification chip in the cartridge container 100. In the non-limiting aspect or embodiment depicted in the drawings, the short range identification reader may be a radio-frequency identification (RFID) reader 203 programmed or configured to scan an RFID chip 105 in the cartridge container 100. The RFID chip 105 contains a tag associated with computer-readable identifying information 300 associated with the cartridge container 100. For example, the identifying information 300 may include a description of the article stored in each of the internal chambers 120 (shown in FIG. 2) of the cartridge container 100, and which doors 110 of the cartridge have already been opened. The identifying information 300 may further include operating status of the cartridge container 100 to indicate whether the cartridge container 100 is attached to the storage container 1000. The identifying information 300 may be stored remotely, for example in a database 400 on a server computer 500. To retrieve the identifying information 300 associated with the cartridge container, microprocessor 220 instructs the RFID reader 203 to scan the RFID chip 105. Once the RFID reader 203 detects the tag of the RFID chip 105, the microprocessor 220 communicates the tag to the server computer 500 via an Internet- or cloud-based connection. The server computer 500 references the tag against the identifying information 300 in a database 400 and transmits back to the microprocessor 220 the identifying information 300 associated with the tag. The microprocessor 220 may be further configured to transmit updated identifying information 300 to the database 400 of the server computer 500. For example, the microprocessor 220 may transmit updated identifying information 300 when one of the plurality of doors 110 is opened, when the cartridge container 100 is attached or detached from the base, and/or when the storage container 1000 is powered on and available for remote communication.

With continued reference to FIG. 7, the storage container may further include sensory alerts which are activated during the release event to attract the attention of the user.

For example, the storage container 1000 may include a speaker 205 disposed in at least one of the base 200 and the cartridge container 100. The speaker 205 may be configured to emit a sound alerting the user that the release event has occurred or is imminent. The speaker 205 may be actuated via an electrical signal transmitted by the microprocessor 220. Similarly, at least one of the base 200 and the cartridge container 100 may include one or more lights 206 configured to illuminate via an electrical signal transmitted by the microprocessor 220. The sensory alerts, including the speaker 205 and/or the lights 206, may also be actuated by the microprocessor 220 to indicate a problem condition with the storage container 1000. For example, the microprocessor may be programmed of configured to actuate the speaker 205 and/or the lights 206 if the cartridge container 100 is incorrectly loaded or not properly attached to the base 200. Other sensory alerts configured to attract the attention of the user to a release event or problem condition may be appreciated by one having ordinary skill in the art.

Figure 8A:
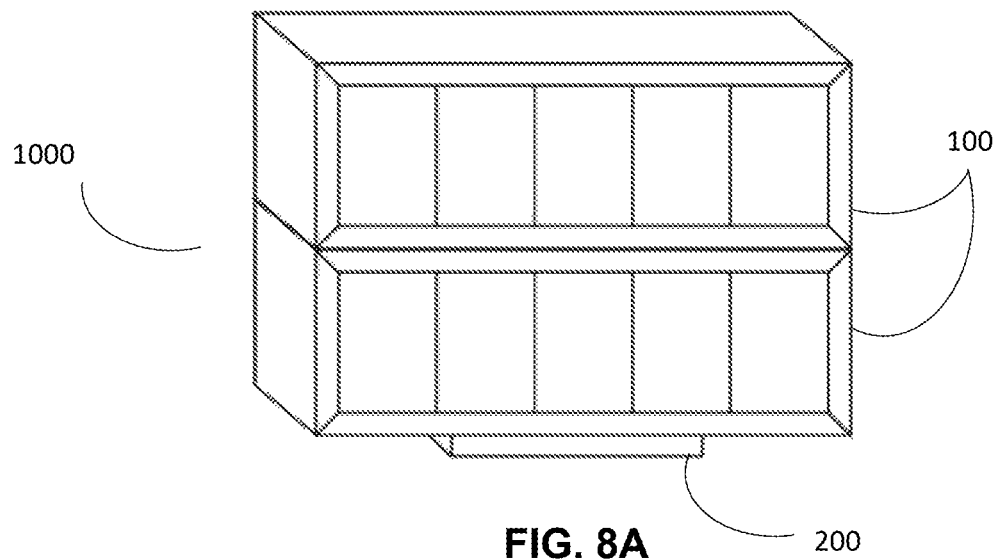
FIG. 8A is a perspective view of a storage container according to another non-limiting aspect or embodiment of the present invention, including two cartridge containers.
Figure 8B:
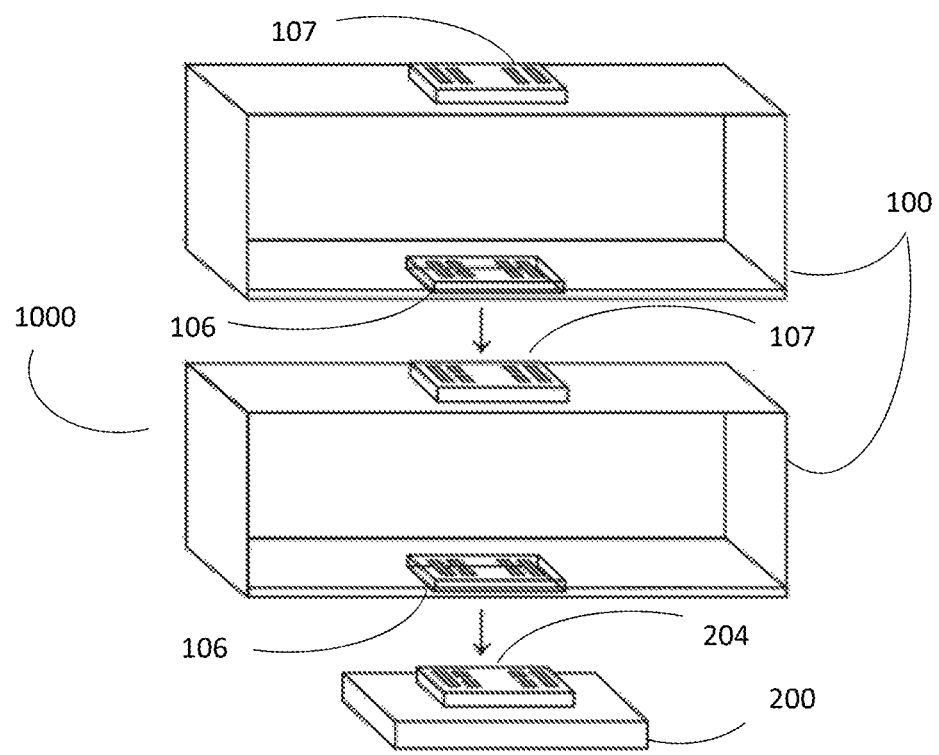
FIG. 8B is an exploded view of the storage container of FIG. 7, with internal components removed for clarity.

In a further aspect or embodiment of the storage container as shown in FIGS. 8A-8B, the cartridge container 100 may be configured for stacking with other cartridge containers 100 on the same base. In this aspect or embodiment, a plurality of actuators 210 are disposed in each cartridge container 100 and are configured to engage and actuate the plurality of doors 110 of that cartridge container 100. This is in contrast to the aspect or embodiment of FIGS. 1-5, in which the plurality of actuators 210 are disposed in the base. To facilitate communication between the microprocessor 220 and the plurality of actuators 210, the base 200 includes a base contact plate 204 configured to engage and communicate with a corresponding contact terminal 106 on the cartridge container 100, such that an electrical circuit 150 between the microprocessor 220 and the cartridge container 100 is established. Each of the stacked cartridge containers 100 further includes a cartridge contact plate 107 configured to engage and communicate with the contact terminal 106 of an adjacent cartridge container 100. In particular, the base contact plate 204 and cartridge contact plate 107 include electrically conductive contacts configured to interface with corresponding electrically conductive contacts on the contact terminals 106. The electrically conductive contacts may include a ground contact, a power contact, and one or more auxiliary contacts for transmitting electrical signals between the base 200 and the plurality of stacked cartridge containers 100. In this manner, one or more electrical circuits 150 may be established between all of the stacked cartridge container 100 and the base.

Figure 9A:
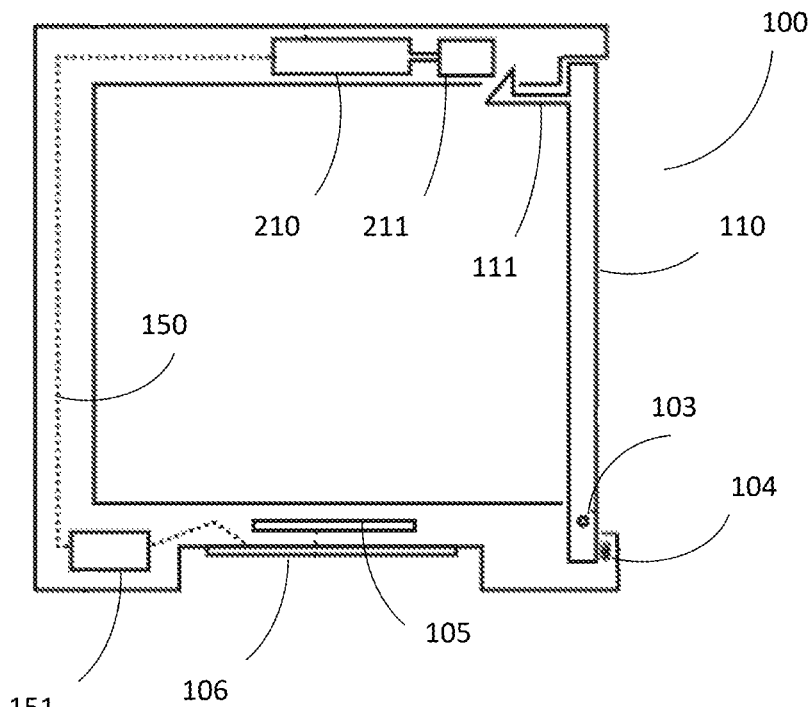
FIG. 9A is a cross sectional view of one of the cartridge containers of the storage container of FIG. 8.
Figure 9B:
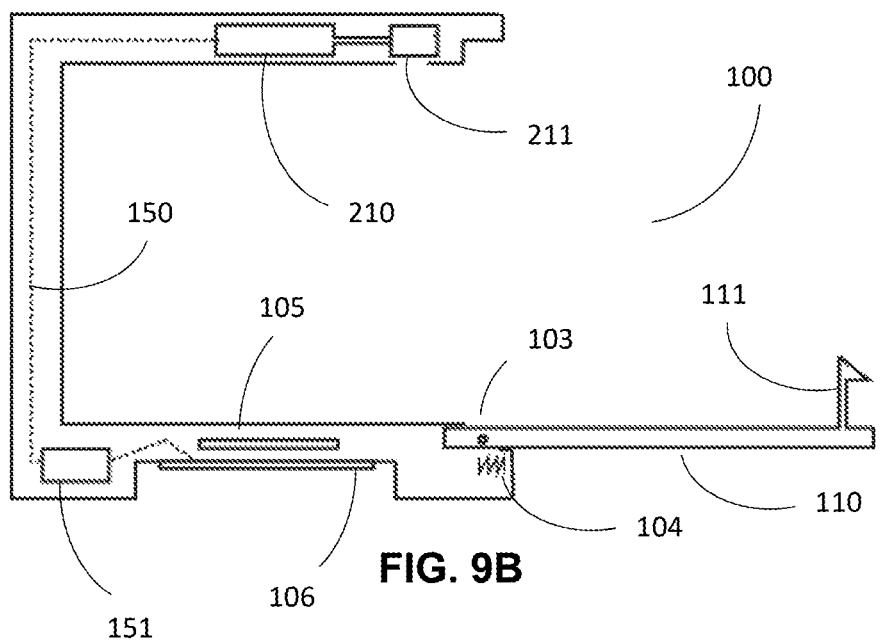
FIG. 9B is the cross sectional view of FIG. 9A with one of the doors in an opened position.

FIGS. 9A-9B illustrate the internal arrangement of the cartridge container 100 of FIGS. 8A-8B. In the depicted non-limiting aspect or embodiment, each actuator 210 is a solenoid disposed in the cartridge container 100 and configured to displace the door tab 111 holding the corresponding door 110 in the closed position. When the actuator 210 receives a command from the microprocessor 220, the actuating rod 211 engages the corresponding door tab 111 to disengage the door tab 111 from the cartridge container 100. The door spring 104 then biases the corresponding door 110 toward the opened position.

Figure 14A:
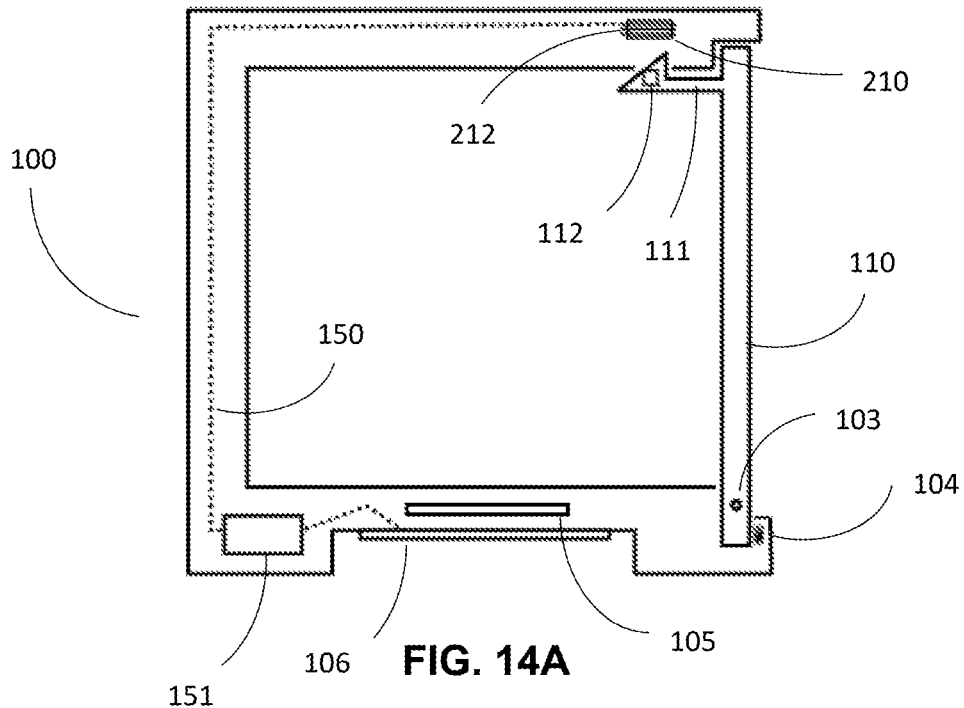
FIG. 14A is a is a cross sectional view of one of the cartridge containers of the storage container of FIG. 8, according to another non-limiting aspect or embodiment of the present invention.
Figure 14B:
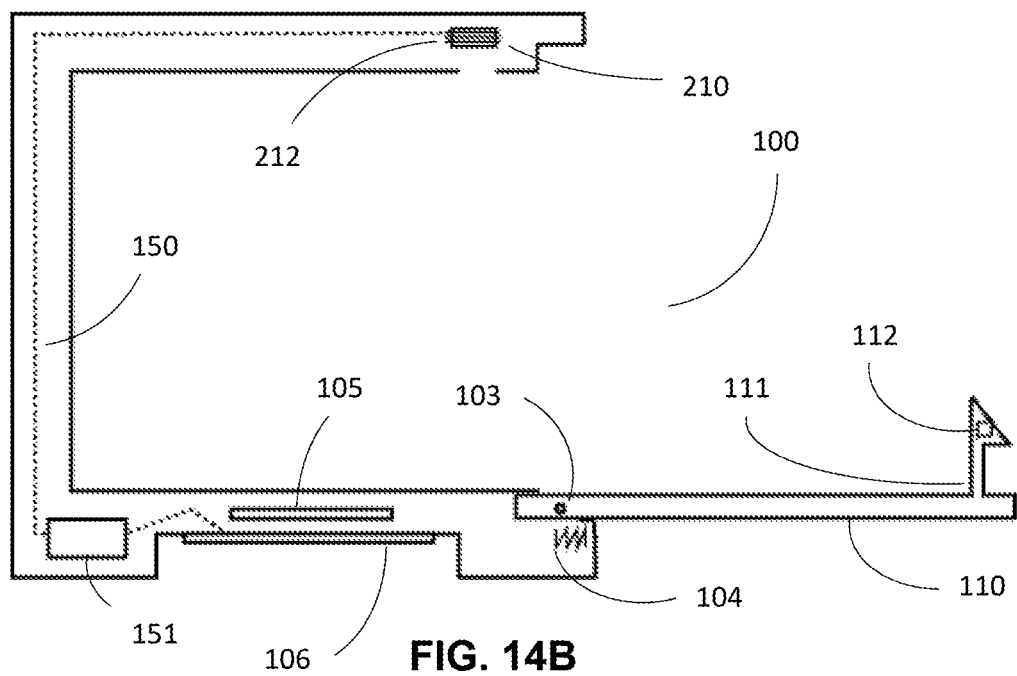
FIG. 14B is the cross sectional view of FIG. 14A with one of the doors in an opened position.

Referring now to FIGS. 14A-14B, in another non-limiting aspect or embodiment, each actuator 210 is an electromagnet 212 in operable proximity to a door magnet 112, such as a rare earth magnet, disposed in the door tab 111 of the corresponding door. When the actuator 210 receives a command from the microprocessor 220, the electromagnet 212 is activated and repels the door magnet 112, causing the door tab 111 to disengage from the cartridge container 100. The door spring 104 then biases the corresponding door 110 toward the opened position.

With continued reference to FIGS. 9A-9B and 14A-14B, each cartridge container 100 may further include a subprocessor 151 disposed in the electrical circuit 150 between the contact terminal 106 and the plurality of actuators 210. The subprocessor 151 of each cartridge container 100 may be configured to receive a command from the microprocessor 220 and to determine whether that command requires any of the actuators 210 in that cartridge container 100 to be actuated. If one of the actuators 210 in that cartridge containers 100 is to be actuated, the subprocessor 151 will direct an electrical signal to the proper actuator 210. If none of the actuators 210 in that cartridge containers 100 are to be actuated, the subprocessor 151 may serve as a pass through device, allowing the command from the microprocessor 220 to continue through the electrical circuit 150 to the cartridge contact plate 107 and, ultimately, to an adjacent cartridge container 100. Thus, the microprocessor 220 in the base 200 is able to communicate with any one of the stacked cartridge containers 100 whether or not that cartridge container 100 is in direct physical contact with the base. For example, the microprocessor 220 may communicate with a second of the stacked cartridge containers 100 using the subprocessor 151 of a first of the cartridge containers 100 as a pass through device. In this manner, an expandable array of individually operable cartridge containers 100 may be constructed according to the specific needs of a given application. Each cartridge container 100 in the expandable array need not be the same size, shape, or contain the same number of internal chambers 120.

Figures 10A, 10B:
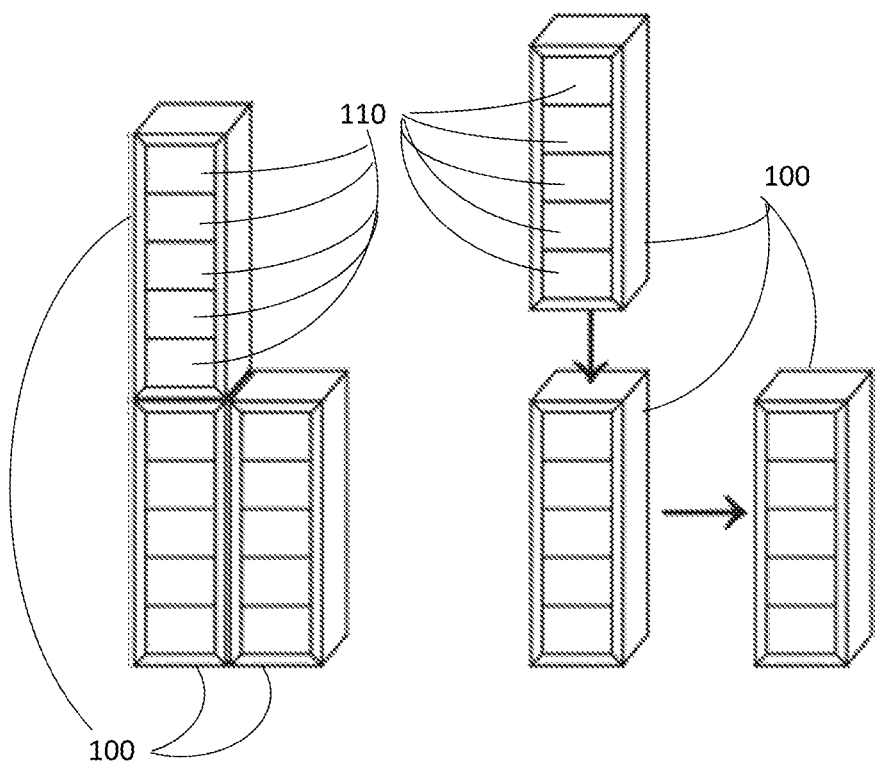
FIG. 10A is a perspective view of a storage container according to another non-limiting aspect or embodiment of the present invention, including three cartridge containers.
FIG. 10B is an exploded view of the storage container of FIG. 10A.

FIGS. 10A-10B illustrates a further aspect or embodiment in which the cartridge containers 100 are configured for horizontal stacking as well as vertical stacking. To facilitate horizontal stacking, each cartridge container 100 alternatively or additionally includes a cartridge contact plate 107 and/or a contact terminal 106 on a side surface (not shown for clarity). One skilled in the art may further envision additional or alternative connection and stacking arrangements by locating the cartridge contact plate 107 and/or a contact terminal 106 on other surfaces of the cartridge container 100. Additionally, the storage container 1000 may be configured to have the plurality of doors 110 distributed across multiple faces of the cartridge container 100. As may be appreciated by one having ordinary skill in the art, the storage container 1000 and the cartridge container 100 may be configured in any suitable and/or desirable size and shape.

Figure 11:
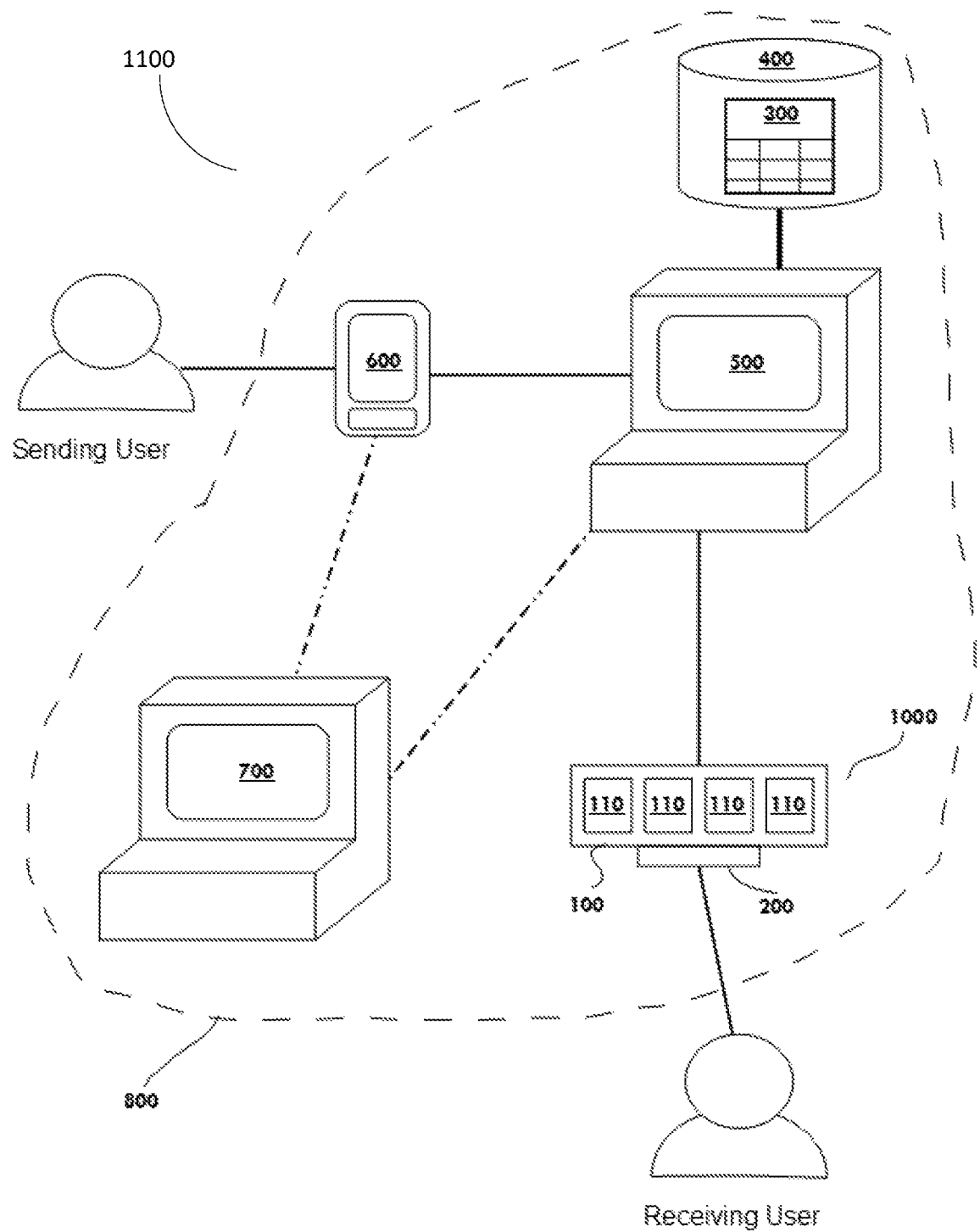
FIG. 11 is system schematic according to another non-limiting aspect or embodiment of the present invention.

Other non-limiting aspects or embodiments of the present invention relate to a system for dispensing articles. FIG. 11 illustrates a schematic diagram of a system 1100 which generally includes a storage container 1000 having a plurality of individually operable doors 110 controlled by a microprocessor 220. The storage container 1000 is associated with a receiving user and may be substantially similar to any of the aspects or embodiment described herein with reference to FIGS. 1-10 and variations thereof. In particular, the storage device may include a detachable and replaceable cartridge container 100. The system 1100 further includes a client device 600 and at least one server computer 500. The storage container 1000, client device, and server computer 500 may communicate via a wired or wireless Internet connection and/or a cloud-based network 800. The client device 600 may be configured to communicate with the microprocessor 220 of the storage container 1000 and with the server computer 500. The client device 600 may be further configured to generate at least one instruction and transmit the at least one instruction to the server computer 500. Based on the at least one instruction, the server computer 500 transmits a command to the microprocessor 220 of the storage container 1000. The command transmitted by the server computer 500 triggers a release event which causes the microprocessor 220 to open one of the plurality of doors 110 of the storage container 1000 via actuation of an actuator 210 corresponding to that door 110.

The server computer 500 may be configured to immediately transmit the command to the microprocessor 220 upon receiving the at least one instruction from the client device 600. By, immediately transmit, it is meant that the server computer 500 transmits the command without delay, not including a reasonable time allotment for the at least one instruction to be communicated to the server computer 500 and for the server computer 500 to process the at last one instruction. Similarly, the microprocessor 220 may be configured to immediately open one of the plurality of doors 110 based on the command from the server computer 500. In this manner, the doors 110 may be controlled with precise and on-demand timing from the client device 600.

The client device 600 may be any suitable device which provides an Internet-based interface for communication with the server computer 500. In particular, the client device 600 may be a personal computer or smart phone configured to receive an input from a sending user and/or a receiving user. The client device 600 is configured to then generate the at least one instruction for transmission to the server computer 500 based on the user input. In the aspect or embodiment shown in FIGS. 12A-12E, the client device 600 is a smart phone controlled by the sending user. However, another aspect or embodiment in which the client device 600 is a personal computer would include substantially the same elements and functionality described hereafter. The client device 600 includes a mobile interface 601 having one or more selectable options 602 which allow the sending user to choose the at least one instruction to be transmitted to the server computer 500, and, ultimately, the command transmitted to the microprocessor 220 of the storage container 1000. In this manner, the sending user may control the receiving user's access to the articles contained in the storage container 1000 by initiating the release event through the client device 600.

Figures 12A, 12B, 12C, 12D, 12E:
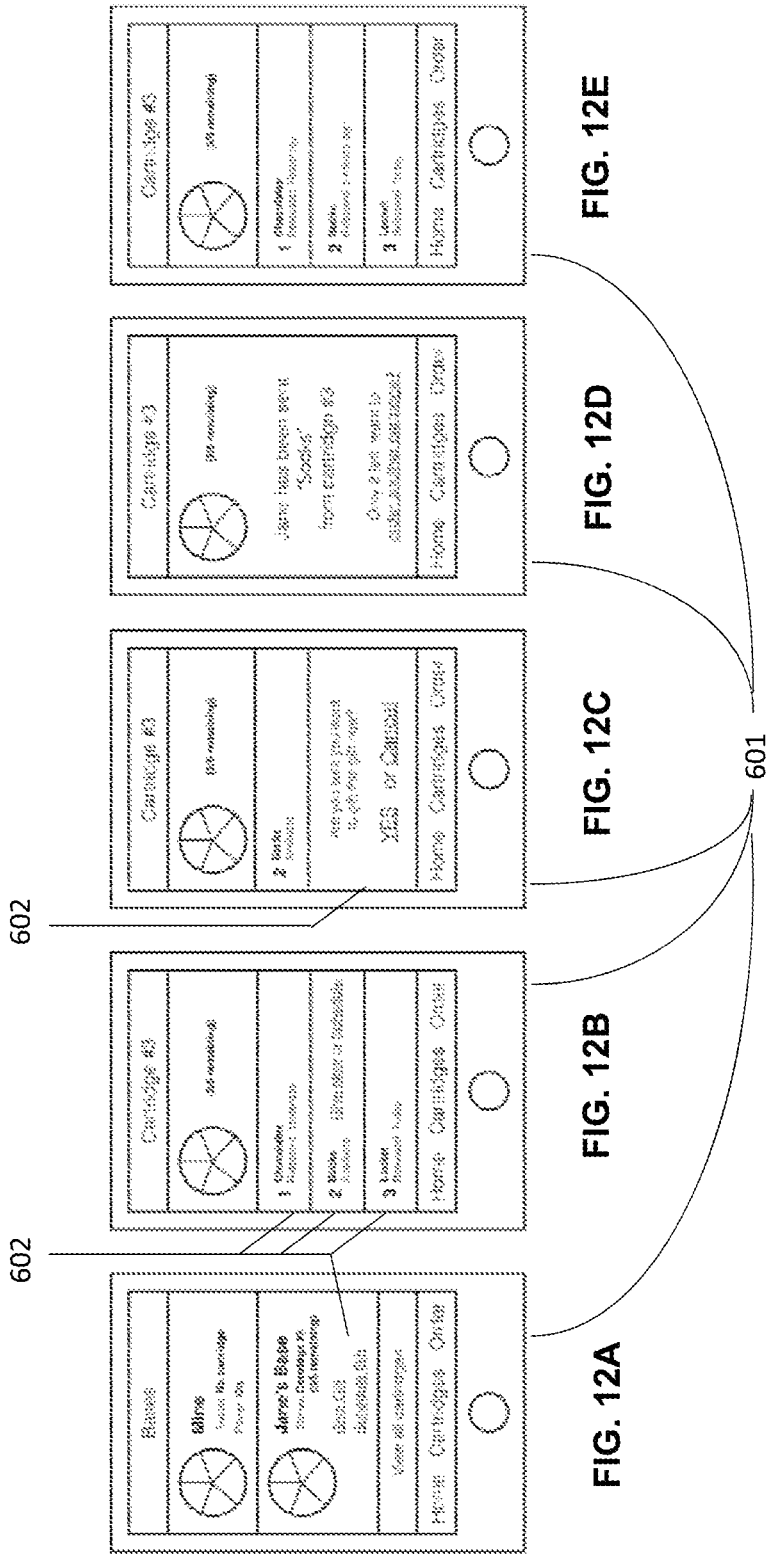
FIGS. 12A-12E are client device interfaces of the system of FIG. 11.

FIGS. 12A-12E illustrate sequential screens of the mobile interface 601 corresponding to steps taken by the sending user. As shown in FIG. 12A, one of the selectable options 602 of the mobile interface 601 may be "Give Gift". Selection of this option opens another screen prompting the sending user to choose from another list of selectable options 602 corresponding to the articles stored in each internal chamber 120 of the storage container 1000, as shown in FIG. 12B. Selection of one of these options, for example "Socks" opens another screen prompting the sending user to confirm the selection, as shown in FIG. 12C. As shown in FIG. 12D, confirmation of the selection opens a dialogue screen informing the sending user that an instruction has been generated to open the door 110 of the storage container 1000 corresponding to the internal chamber 120 in which the selected article is stored. Finally, as shown in FIG. 12E, the mobile interface 601 displays a screen showing that the selected article—in this case "Socks"—were released. The system 1100 can thus be used as a means for the sending user to remotely select and give gifts, rewards, or tokens to the receiving user on demand. The selectable options 602 described above are merely exemplary and not exhaustive of the selectable options 602 that may be provided. For example, a further selectable option 602 may allow the sending user to label the contents of the corresponding internal chamber 120 when different articles are loaded in to the cartridge container 100.

With continued reference to FIGS. 12A-12E, the mobile interface 601 may be configured to provide the sending user with a variety of options for generating the at least one instruction. For example, in FIG. 12A, an alternative selectable option 602 to "Give Gift" is "Schedule Gift". Choosing the "Schedule Gift" selectable option 602 prompts the sending user to select an article to release similar to the "Give Gift" selectable option 602, but the sending user must further input date and/or time information indicating when the selected article should be released. The date and/or time information is then communicated by the client device 600 to the server computer 500, where the date and/or time information is stored in a schedule in the database 400. The server computer 500 is programmed or configured to transmit a command to the microprocessor 220 of the storage container 1000 at the scheduled date and/or time, causing the selected article to be released. Thus, the "Schedule Gift" selectable option 602 facilitates opening one or more of the plurality of doors 110 at a predetermined future date and time, rather than immediately opening the door 110 as with the "Give Gift" selectable option.

The mobile interface 601 may further display identifying information 300 associated with the cartridge container 100. For example, the mobile interface 601 may display a name or identification number associated with the cartridge container 100, the contents of each internal chamber 120, and whether each door 110 has been previously opened. The identifying information 300 is retrievable by the client device 600 from a database 400 stored on the server computer 500.

The client device 600 is not limited to devices directly controlled by the user. In another aspect or embodiment, the client device 600 may be an IOT device capable of providing personal informatics, such as a fitness tracking device or an Internet-connected weighing scale. In such an aspect or embodiment, the server computer 500 may be programmed or configured to detect when the receiving user has completed a predetermined task as indicated via the client device 600, and to automatically generate the at least one instruction based on the completion of that task. In another aspect or embodiment, the client device 600 may be configured to generate the at least one instruction based on a calculation or manipulation of data provided by the user. For example, the receiving user may enter personal informatics, such as caloric intake information, into the client device, and the client device 600 may generate the at least one instruction based on whether or not a predetermined goal or threshold has been achieved. Alternatively, entry of the personal informatics could be delegated to one or more third parties or escrows including but not limited to dieticians, clinicians, or personal trainers. Still further, the enterer of the personal informatics may use quantified measurements from client device 600 in combination with information or data obtained from other sources to validate the achievement of a goal or threshold. Thus, validation of a goal or threshold may include an aggregating data from a plurality of human and non-human sources. In this manner, the system 1100 may be used to provide rewards to the receiving user to incentivize positive habits and behavior.

As discussed above, the server computer 500 may be configured to store a database 400 containing identifying information 300 associated with the cartridge container 100. More particularly, the server computer 500 may be configured to store identifying information 300 associated with a plurality of cartridge containers 100, such that the system 1100 may include any number of cartridge containers 100 but only a single server computer 500. As discussed above, the identifying information 300 for each cartridge container 100 includes a name or identification number associated with the cartridge container 100, the contents of each internal chamber 120, and whether each door 110 of the cartridge has been previously opened. The identifying information 300 may further include operating status of the cartridge container 100 to indicate whether the cartridge container 100 is attached to the storage container 1000. Utilizing the operating status of the cartridge container 100, the server computer 500 may be configured to prohibit the client device 600 from transmitting instructions for the cartridge container 100 if the cartridge container 100 is not attached to the storage container 1000.

The identifying information 300 may further include user authorization data for the sending user and/or the receiving user. The user authorization data for each cartridge container 100 is associated with one or more client devices 600 and one or more storage containers 1000. Utilizing the user authorization data, the server computer 500 may be configured to only transmit a command to the storage container 1000 if the user authorization data of the cartridge container 100 matches both the storage container 1000 and the client device 600. In this manner, only authorized users may control and/or access a specific cartridge container 100. The user authorization data need not be a one-to-one-to-one association between the client device, cartridge container 100, and storage container 1000. For example, one client device 600 may be authorized to transmit instructions for multiple cartridge containers 100 and/or storage containers 1000. Similarly, one storage container 1000 may be authorized to receive commands originating from multiple client devices 600. In another configuration, one client device 600 may be authorized to transmit instructions for one storage container 1000, but only when one or more specific cartridge containers 100 are attached to that storage container 1000. It is to be understood that other authorization schemes may be envisioned and appreciated by one having ordinary skill in the art.

The database 400 containing identifying information 300 may be preprogrammed into the server computer 500 by the sending user and/or the receiving user via the client device 600. Alternatively, the identifying information 300 associated with the cartridge containers 100 which are pre-loaded by a merchant may be preprogrammed into the server by the merchant. The identifying information 300 for each cartridge container 100 is associated with a tag, which may be, for example, embedded in an RFID chip 105 on the cartridge container 100. The microprocessor 220 of the storage container 1000 may be configured to scan the tag, via an RFID reader 203, and to communicate that tag to the server computer 500. The server computer 500 may then access the identifying information 300 associated with the in-use cartridge container 100 based on the tag scanned by the RFID reader 203. The server computer 500 may then transmit the identifying information 300 of the in-use cartridge container 100 to the client device 600.

The identifying information 300 may be continually updated in the server computer 500 via the microprocessor 220 of the storage container 1000, the client device 600, or the receiving user. Each time the cartridge container 100 is attached to or detached from the storage container 1000, as detected by the RFID reader 203, the microprocessor 220 may be configured to retrieve information 300 about the cartridge container 100 and/or update the operating status of the cartridge container 100. Each time one of the actuators 210 of the storage container 1000 is actuated to open a corresponding door 110 of the cartridge container 100, the microprocessor 220 may transmit a signal to the server computer indicating which door 110 had been opened. The server computer 500 may then update the identifying information 300 in the database 400 to indicate the door 110 has been opened. After the identifying information 300 has been updated by the microprocessor 220, the client device 600 may then retrieve the updated identifying information 300 from the server computer 500.

The system 1100 may further include a merchant transaction server 700 in communication with the client device 600 and/or the server computer 500. The merchant transaction server 700 is associated with the merchant of pre-loaded cartridge containers 100, and may include an Internet-based inventory database 400 retrievable by the client device 600 and/or the server computer 500. The mobile interface 601 of the client device 600 may include a selectable option 602 for allowing the sending user to browse and purchase new, pre-loaded cartridge containers 100 from the merchant via a web-based or cloud-based store. The pre-loaded cartridge containers 100 may contain a merchant-selected plurality of articles, or the sending user may be given the option to customize the contents of the pre-loaded cartridge container 100, for example through a third party retailer. Once one or more pre-loaded cartridge containers 100 have been selected or customized, the client device 600 may be configured to transmit a purchase order to the merchant transaction server 700 via the mobile interface 601. Alternatively, the client device 600 or the server computer 500 may be configured to automatically transmit a purchase request to the merchant transaction server 700 when all of the doors 110 of the cartridge container 100 have been opened. The client device 600 and/or the server computer 500 may be programmed or configured to send the purchased pre-loaded cartridge container 100 directly to the receiving user for attachment to the storage container 1000. In a further non-limiting aspect or embodiment, the receiving user may return an empty, or spent, cartridge container 100 to a merchant. The merchant may then recycle the spent cartridge container 100 by refilling it with new articles pursuant to a purchase order transmitted to the merchant transaction server 700, as described above. The merchant may also wipe the identifying information 300 from the spent cartridge container 100 and program new identifying information 300 into the cartridge container if the cartridge container 100 is refilled with different articles than it originally contained. The authorization data may be either wiped or maintained, depending on whether the refilled cartridge container 100 is to be sent to the same user or a new user. Wiping the authorization data protects the security of the new user, as the original user would no longer be authorized to access the cartridge container 100.

In other non-limiting aspects or embodiments, the sending user may be able to refill the cartridge container 100, replace the identifying information 300, and wipe the authorization data using, for example, the client device 600. In this manner, the sending user may provide a refilled cartridge container to the same or a new receiving user without a merchant acting as an intermediary.

Figure 13:
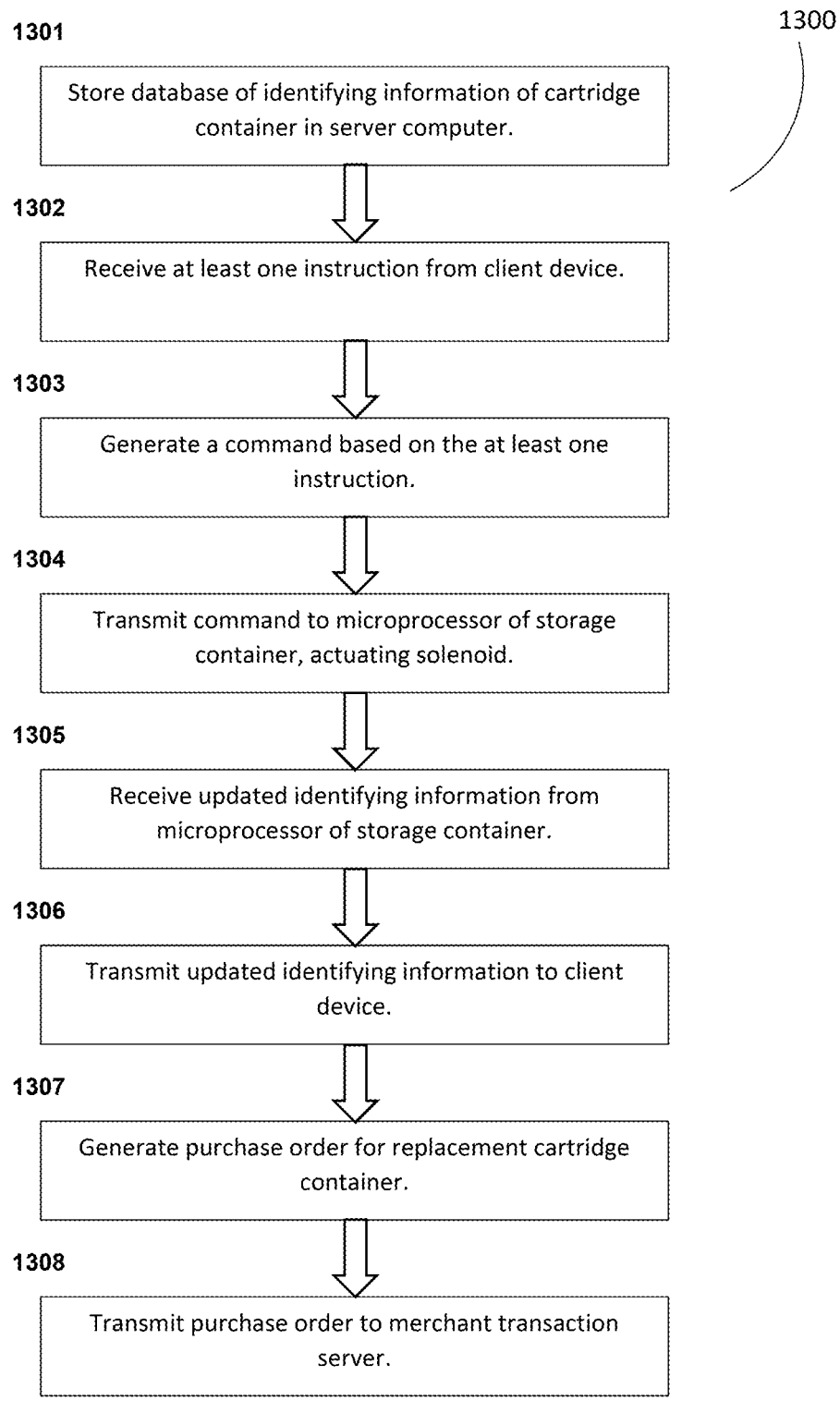
FIG. 13 is a method step sequence according to another non-limiting aspect or embodiment of the present invention.

Other non-limiting aspects or embodiments of the present invention relate to a computer-implemented method for dispensing articles from a storage container 1000, as shown in the sequence step diagram 1300 of FIG. 13. Components and sequence steps not specifically discussed in reference to FIG. 13 hereafter are understood to be substantially similar to the same components or sequence steps discussed in connection with the system 1100 of FIGS. 11-12E. At step 1301, a database 400 containing identifying information 300 associated with a cartridge container 100 is stored in a server computer 500. The identifying information 300 may be substantially similar to any of the aspects or embodiments described in reference to FIGS. 11-12E. At step 1302, at least one instruction is received from a client device 600. The client device 600 may be substantially the same as any aspect or embodiment of the client device 600 discussed in reference to FIGS. 11-12E. The at least one instruction may be generated by the user via a user interface of the client device, substantially similar to the mobile interface 601 discussed in reference to FIGS. 11-12E. Alternatively, the client device 600 may automatically generate the at least one instruction based on a predetermined condition being met. At step 1303, a command is generated by a server computer 500 based on the at least one instruction. At step 1304, the command is transmitted from the server computer 500 to a microprocessor 220 of a storage container 1000. The storage container 1000 includes the cartridge container 100, and may be substantially similar to any of the aspects or embodiment described herein with reference to FIGS. 1-10 and variations thereof. In particular, the cartridge container 100 may be detachable and replaceable and may include a plurality of independently operable doors 110. The command transmitted from the server computer 500 may cause the microprocessor 220 of the storage container 1000 to transmit an electrical signal to an actuator 210 configured to open one of the plurality of doors 110 of the cartridge container 100.

In a non-limiting aspect or embodiment, the method may further include receiving, from the microprocessor 220 of the storage container 1000, updated identifying information 300, as shown in step 1305. At step 1306, the updated identifying information 300 is transmitted to the client device 600. The method may further include generating a purchase order for a pre-loaded replacement cartridge container 100 based on at least one of the updated identifying information 300 and a communication from the client device, as shown at step 1307. For example, the purchase order may be generated based on the updated identifying information 300 indicating that all of the plurality of doors 110 of the cartridge container 100 have been opened. Alternatively or additionally, the purchase order may be generated based on a user manually requesting a replacement cartridge from the interface of the client device 600. At step 1308, the purchase order is transmitted to a merchant transaction server 700. The pre-loaded cartridge container 100 may be sent directly to the receiving user for attachment to the storage container 1000.

In another non-limiting aspect or embodiment, step 1303, generating the command by the server computer 500 based on the at least one instruction, may be immediately performed upon receiving the at least one instruction from the client device 600 in step 1302. By, immediately performed, it is meant that step 1303 occurs without delay, not including a reasonable time allotment for the at least one instruction to be communicated to the server computer 500 and for the server computer 500 to process the at least one instruction. Similarly, step 1304, transmitting the command from the server computer 500 to the microprocessor 220 of a storage container 1000, may be immediately performed after the command is generated by the server computer 500 in step 1303. In this manner, the method may be used to dispense articles on demand via the client device 600.

Although the invention has been described in detail for the purpose of illustration based on certain aspects or embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A storage container comprising:
   a cartridge container defining a plurality of internal chambers and comprising a plurality of individually operable doors, each of the plurality of doors corresponding to one of the plurality of internal chambers;
   a base comprising a microprocessor and a base contact plate configured to be electrically connected to a contact terminal of the cartridge container; and
   a plurality of individually addressable actuators disposed in at least one of the base and the cartridge container, each of the plurality of actuators corresponding to one of the plurality of doors;
   wherein the microprocessor is programmed or configured to:
      receive at least one instruction from a server computer; and
      transmit a command, based on the at least one instruction, by communicating an electrical signal through the base contact plate to the contact terminal to actuate one of the plurality of actuators;
   and wherein actuating one of the plurality of actuators causes the corresponding door to move from a closed position to an opened position.

2. The storage container of claim 1, wherein one or more, or each of, the plurality of actuators comprises one of:
   solenoid having an extendable and retractable actuating rod configured to engage the corresponding door; and
   an electromagnet configured to repel a door magnet disposed in the corresponding door.

3. The storage container of claim 1, wherein the cartridge container is removably attached to the base such that the cartridge container is replaceable; and
   wherein the cartridge container is refillable.

4. The storage container of claim 3, further comprising:
   a short-range identification reader disposed in the base; and
   a short-range identification chip disposed on the cartridge container in operative alignment with the short-range identification reader;
   wherein the short-range identification reader is programmed or configured to detect the short-range identification chip on the cartridge container when the cartridge is attached to the base.

5. The storage container of claim 4, wherein the short-range identification reader comprises an RFID reader.

6. The storage container of claim 1, wherein the cartridge container further comprises a plurality of door release latches configured to engage the plurality of doors, each of the door release latches corresponding to one of the plurality of doors and one of the plurality of actuators,
   wherein actuating one of the plurality of actuators causes the corresponding door release latch to disengage from the corresponding door.

7. The storage container of claim 1, wherein the cartridge container is one of a plurality of stackable cartridge containers of the same or differing sizes;
   wherein the first of the stackable cartridge containers comprises a cartridge contact plate electrically connectable to a contact terminal of a second of the stackable cartridge containers;
   wherein the base contact plate and the cartridge contact plate each comprise one or more electrically conductive contacts configured to interface and establish an electrical circuit with corresponding electrically conductive contacts on the interfacing contact terminal; and
   wherein each of the plurality of stackable cartridge containers comprises a subprocessor programmed or configured to receive the command from the microprocessor.

8. The storage container of claim 1, wherein the microprocessor is further programmed or configured to transmit identifying information associated with the cartridge container to the server computer.

9. The storage container of claim 1, wherein the microprocessor is programmed or configured to transmit the command instantaneously upon receiving the at least one instruction.

10. A system for remotely dispensing articles comprising:
   a storage container comprising:
      a cartridge container defining a plurality of internal chambers and comprising a plurality of individually operable doors, each of the plurality of doors corresponding to one of the plurality of internal chambers; and
      a base comprising a microprocessor and a base contact plate configured to be electrically connected to a contact terminal of the cartridge container;
   a client device associated with a sending user and programmed or configured to generate at least one instruction; and
   a server computer in communication with the client device and the storage container, the server computer programmed or configured to:
      receive the at least one instruction from the client device; and
      transmit a command to the microprocessor of the storage container based on the at least one instruction;
   wherein the microprocessor of the storage container is programmed or configured to communicate an electrical signal through the base contact plate to the contact terminal to actuate one or more actuators corresponding to one or more of the individually operable doors based on the command transmitted by the server computer, wherein actuating the actuator causes the corresponding one of the individually operable doors to open.

11. The system of claim 10, wherein one or more of the internal chambers encloses an object comprising one of: a token, a gift, a letter or note, money, and a gift card.

12. The system of claim 10, wherein the server computer comprises a database containing identifying information associated with the cartridge container; and
   wherein the microprocessor is configured to transmit updated identifying information associated with the cartridge container to the server computer.

13. The system of claim 10, wherein the client device comprise a mobile interface having a plurality of selectable options; and
   wherein the at least one instruction is based on one of the plurality of selectable options chosen by the sending user.

14. The system of claim 13, wherein the client device is programmed or configured to retrieve at least a portion of the identifying information from the server computer; and
   wherein the mobile interface of the client device is programmed or configured to display the retrieved identifying information.

15. The system of claim 14, further comprising a merchant transaction server,
   wherein the server computer is programmed or configured to:
      generate a purchase order based on at least of the selectable options of the mobile interface of the client device and the identifying information of the cartridge container; and
      transmit the purchase order to the merchant transaction server.

16. The system of claim 10, wherein the client device is programmed or configured to obtain and store personal informatics and generate the at least one instruction based at least partially on the personal informatics.

17. The system of claim 10, wherein the server computer is programmed or configured to transmit the command instantaneously upon receiving the at least one instruction.

18. A computer-implemented method for remotely dispensing articles from a cartridge container of a storage container, the method comprising:
   storing, in a database of a server computer, identifying information associated with the cartridge container;
   receiving at least one instruction from a client device;
   generating a command based on the at least one instruction; and
   transmitting the command to a microprocessor of a base of the storage container, the command configured to cause the microprocessor to communicate an electrical signal through a base contact plate to a contact terminal of the cartridge container, wherein transmitting the command causes the microprocessor to actuate an actuator of the storage container, and wherein actuating the actuator opens one of a plurality of independently operable doors of the cartridge container.

19. The computer-implemented method of claim 18, further comprising:
   receiving updated identifying information from the microprocessor; and
   transmitting the updated identifying information to the client device.

20. The computer implemented method of claim 19, further comprising:
   generating a purchase order for a replacement cartridge container; and
   transmitting the purchase order to a merchant transaction server.

21. The computer-implemented method of claim 18, wherein generating the command is performed instantaneously upon receiving the at least one instruction; and
   wherein transmitting the command is performed instantaneously after generating the command.

* * * * *